United States Patent [19]

Bruke

[11] Patent Number: 4,961,864
[45] Date of Patent: Oct. 9, 1990

[54] SEPARATING DEVICE

[75] Inventor: Richard Bruke, Bunkeflostrand, Sweden

[73] Assignee: Spirac Engineering AB, Malmo, Sweden

[21] Appl. No.: 316,288

[22] Filed: Feb. 27, 1989

[30] Foreign Application Priority Data

Feb. 29, 1988 [SE] Sweden ................................ 8800701

[51] Int. Cl.$^5$ ............................................. B01D 29/64
[52] U.S. Cl. ..................................... 210/791; 210/159;
210/162; 210/413; 210/456; 210/498; 210/767
[58] Field of Search ................ 210/159, 162, 407, 409,
210/413, 498, 791, 456, 767; 209/387, 388, 273;
15/246, 246.5

[56] References Cited

U.S. PATENT DOCUMENTS

| 194,960 | 9/1877 | Elliot et al. ........................ 209/387 |
| 2,090,637 | 8/1937 | Paige .................................... 210/409 |
| 4,287,064 | 9/1981 | Ando et al. ......................... 210/413 |

FOREIGN PATENT DOCUMENTS

3108332A1 3/1982 Fed. Rep. of Germany.
WO85/04837 11/1985 World Int. Prop. O.

Primary Examiner—W. Gary Jones
Assistant Examiner—Matthew O. Savage
Attorney, Agent, or Firm—Ladas & Parry

[57] ABSTRACT

A method and device for the separation of substantially solid bodies from a liquid are disclosed in which an obliquely arranged screen grid is provided with an upper region, a lower region, and two opposite edge regions and is suppllied with liquid at the upper region to separate the solid bodies from the liquid in the form of screenings which travel along an upwards facing surface of the screen grid. A cleaning device rests against the upwards facing surface of the screen grid and moves the screenings during movement of the cleaning device horizontally towards the edge regions to cause the screenings to pass onto transport surfaces situated adjacent to the edge regions. The transport surface extends along the length of the screen grid and is smooth.

21 Claims, 5 Drawing Sheets

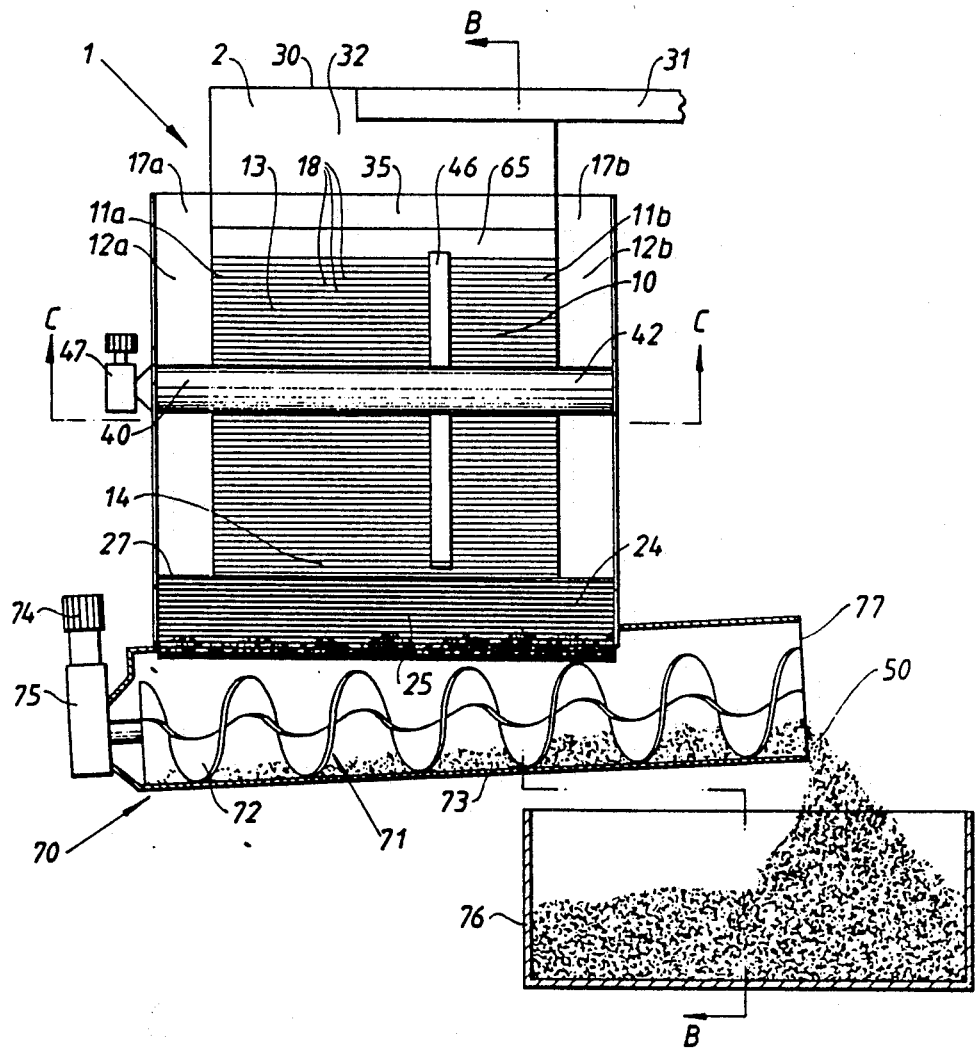
Fig. 2
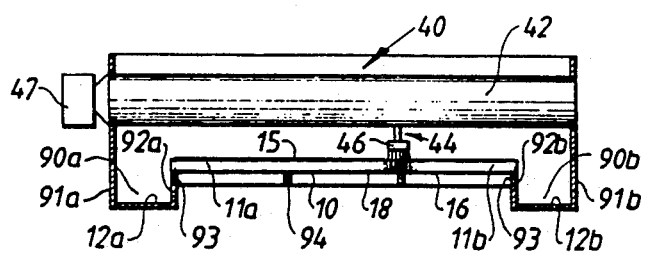
Fig. 3
Fig. 3a

SEPARATING DEVICE

FIELD OF INVENTION

The present invention relates to a method for separating accompanying bodies from a liquid flow and a device for such separation.

BACKGROUND

It is known that for the separation of bodies from liquids, for example the separation of bodies from sewage or industrial process water, devices can be used which include a screen grid. The expression "bodies" here refers to small, though as a rule exceeding 0.1 mm. firm or soft bodies as well as relatively large ones such as e.g. stones, pieces of plastics, cardboard, wood etc. A liquid layer containing the bodies then flows along the upwards facing side of a screen grid oriented at an oblique angle to a vertical plane. The liquid successively passes through the screen grid and is fed to a receiving means which is located below the screen grid whilst the bodies remain on the upwards facing side of the screen grid and form so-called screenings. In most applications the screen grid has such a strong inclination—frequently more than 60° towards the horizontal—that owing to the influence of the liquid flow and gravity the bulk of the screenings falls and/or slides down towards the lower part of the device where it is collected e.g. in a conveyor and removed. The screenings together with the accompanying liquid form a mass of a high liquid content. Before the mass is treated further it is often necessary, therefore, to reduce the liquid content which is done in special equipment often in conjunction with the device including the screen grid.

On using screen grids in the abovementioned context it is a general objective to combine the smallest possible size of screen apertures (so as to achieve optimum separation) with the wish that the screen apertures should not become clogged by the screenings separated. A clogging brings about a successively reduced flow area of the screen grid which after a time leads to the ceasing of the separating function of the grid. Consequently the device has to be disconnected and a cleaning of the screen surface performed at intervals which are too short to allow the efficiency necessary for a sound economy to be achieved. In accordance with a generally known method the cleaning is done by flushing the screen grid with water, often hot water.

The problem mentioned above becomes particularly serious when the liquid contains a high proportion of solid particles or bodies, as for example in the case of septic sludge from three-compartment septic tanks or waste water from food industries, slaughter-houses and paper/cellulose industries. A well-functioning separating equipment for such contaminated liquids is difficult to obtain except at high cost, and requires considerable space. To discharge septic sludge directly to municiple sewage treatment plants often creates problems—especially in the case of smaller units—since the purification process in the plant will be disturbed. Purification of process water often involves such high costs as to be unacceptable because of national or international competition which means that contaminants and polluted waste water are discharged in such large quantities that unacceptable environmental disturbances occur.

Wet screenings, e.g. slaughter-house offal, are difficult to handle and to transport and, moreover, it is often prohibited to dump such screenings. It is necessary, therefore, to dewater the screenings in spite of the high costs of such dewatering. For the dewatering special compactors are used which consist of special piston or screw presses or other special equipment. It has been found impossible to provide effective and functioning devices in spite of the investments for squeezing equipment exceeding many times the costs of the screening equipment itself.

When known and applied methods are used breakdowns frequently occur. Under these circumstances manpower is needed for supervising and cleaning of clogged filters which naturally gives rise to high costs. Various mechanical cleaning devices have been used for keeping the screen grid open. e.g. brushes. Furthermore, as mentioned already, flushing with hot water is also affected. Apart from such flushing not producing sufficiently good cleaning, large quantities of hot water are consumed which in itself involves high energy costs. As an example it may be mentioned that for cleaning a screen grid with 0.1 mm apertures and 1 $m^2$ surface, each cleaning operation requires about 100 1 hot water. In the case of highly contaminated sewage the cleaning operation recurs relatively frequently e.g. twice per hour.

The disadvantages of the known and applied methods have led to other solutions being sought for keeping the screen grid free from clogging screenings. Thus, a technique is described, e.g. in the German patent publication No. DE 31 08 332 where the screen grid is cleaned with brush-like means which, whilst in contact with the screen grid, are displaced along the same and thereby loosen the attached screenings. To prevent the screenings accompanying the movement of the brush means from contacting the limiting edges of the screen grid and there to build up impenetrable banks, the brush means according to the patent are made to follow a specially programmed movement which entails the whole movement in direction towards the center of the device taking place chiefly with the brush means in contact with the screen grid, and the movement towards the limiting edges of the grid occurring with the brush means raised, at least in the region nearest the edges of the grid. It has been found, though, that from a point of view of reliability in operation the result is unsatisfactory, among other things, owing to the difficult medium wherein the equipment operates. Moreover, the equipment requires much space and is slow, since the mechanical construction is such that the equipment cannot cope with the difficult medium in the region of the screen grid. This means large space requirement because the drive unit has to be placed outside the actual screen structure and often in such a manner that the width dimension is increased by more than the entire length of stroke of the brush means. It is also known that reliable drive units for the reciprocating movement of cleaning means are not obtainable.

The problem described is especially aggravated when contaminants have to be separated from a strongly polluted liquid e.g. when freeing liquid from the septic sludge formed in well drains. To achieve this slotted screens with very narrow slots are used. e.g. of the order of magnitude of 1 mm. In the course of the separation, owing to the composition of the sludge and the small size of slots, very rapid clogging of the slots and consequent reduction of the flow area occurs. In order to achieve technically/economically realistic efficiencies, it is necessary therefore, in view of the relatively large volumes of e.g. septic sludge which have to be dealt with, to have access to operationally reliable and effective cleaning devices. Very high demands are made, therefore, on the function and reliability of the driving means in combination with the speed available for the moving of the cleaning means.

SUMMARY OF THE INVENTION

The present invention seeks to a method and a device where the aforementioned disadvantages are eliminated and where a cleaning means on the upper side of the screen grid is in contact with the upper side of the screen grid during reciprocating movements between the two opposite limiting edges and during the whole movement between said edges.

In accordance with the invention the use of a particularly simple driving means for the cleaning device is made possible. This consists of a shaftless spiral which is surrounded by a casing and is rotated in the same around its geometrical longitudinal axis. An axially directed body inside the shaftless spiral has a follower pin projecting from the body which passes through a slit provided in the axial direction of the casing. The projecting pin prevents the axially directed body from rotating. As a result, on rotation of the shaftless spiral, the spiral blade pushes the pin forwards in the axial direction of the spiral. The design of the driving means permits rapid movements and relatively great stroke lengths.

The driving means just described is almost indifferent to the surrounding medium and, moreover, makes a minimum demand on space. In fact the length of the driving means is only narrowly greater than the length of the stroke of the reciprocating movement which the driving means describes.

Thus the driving means makes it possible in screen grids coupled in parallel to place these sideways relatively close together. The subclaims define further practical embodiments of the invention.

BRIEF DESCRIPTION OF THE FIGURES OF THE DRAWING

The invention is described in more detail in connection with a number of Figures, wherein FIG. 2 is a sectional view taken on line A—A in FIG. 1, FIG. 3 is a sectional view taken on line C—C in FIG. 2, FIG. 3a shows a modification of the transport surface in FIG. 3, FIGS. 4-5 are sectional views through section A—A of alternative embodiments of the device.

DETAILED DESCRIPTION OF PREFERRED EMBODIMENTS

Figure 1:
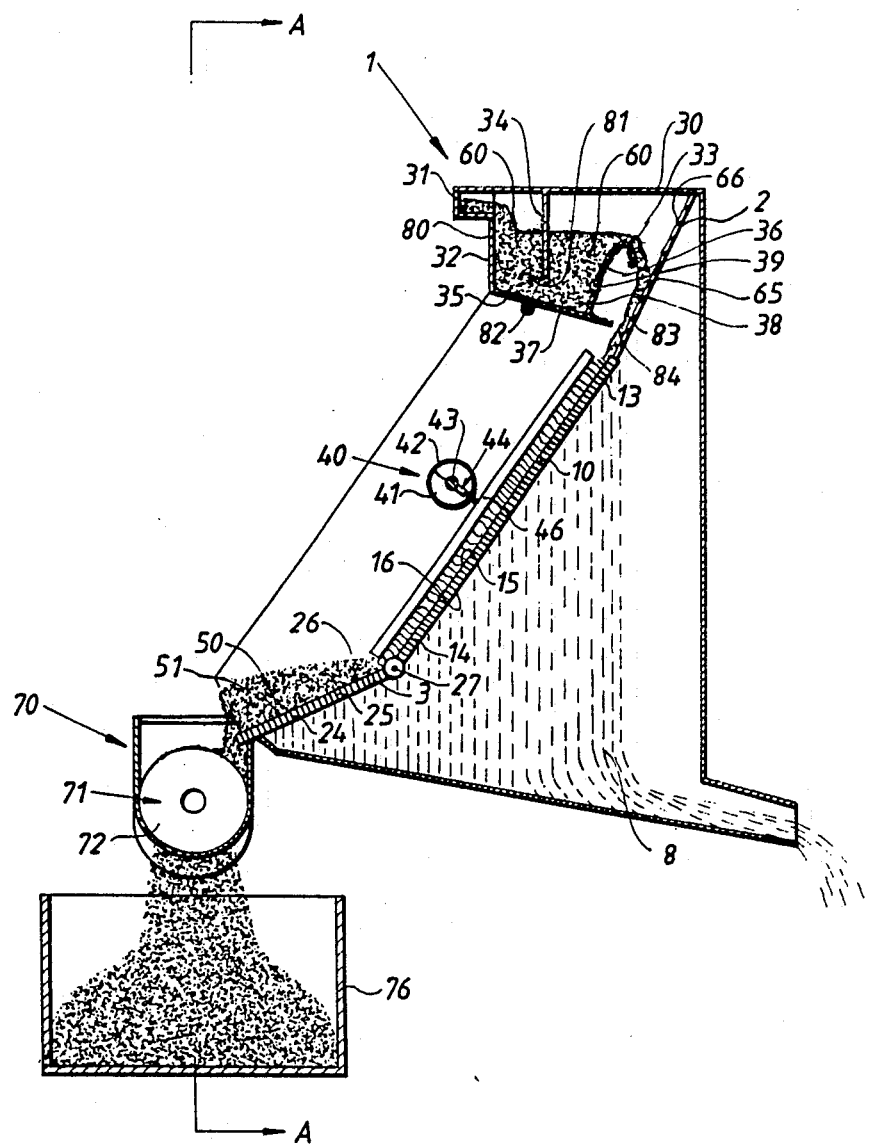
FIG. 1 shows a cross-section through a separating device corresponding to section B—B in FIG. 2.

In FIGS. 1 and 2 is shown a separating device 1 with an upper part 2 and a lower part 3. The device furthermore comprises a screen grid 10 which is at an angle with respect to the vertical. The screen grid has an upper region 13 and a lower region 14 and is limited by two opposite edge regions 11a, 11b which each extends along the lateral edges of the screen grid from the upper region to the lower region. The screen grid has an upwards facing surface 15 and a downwards facing surface 16. Adjoining the respective edge regions connecting means 17a, 17b are provided which each has a transport surface 12a, 12b of an orientation substantially corresponding to the upwards facing surface 15 of the screen grid.

As a rule the screen grid is designed so as to be formed by bars 18 situated parallel with one another and at a distance from one another and of a substantially horizontal orientation.

Figure 5:
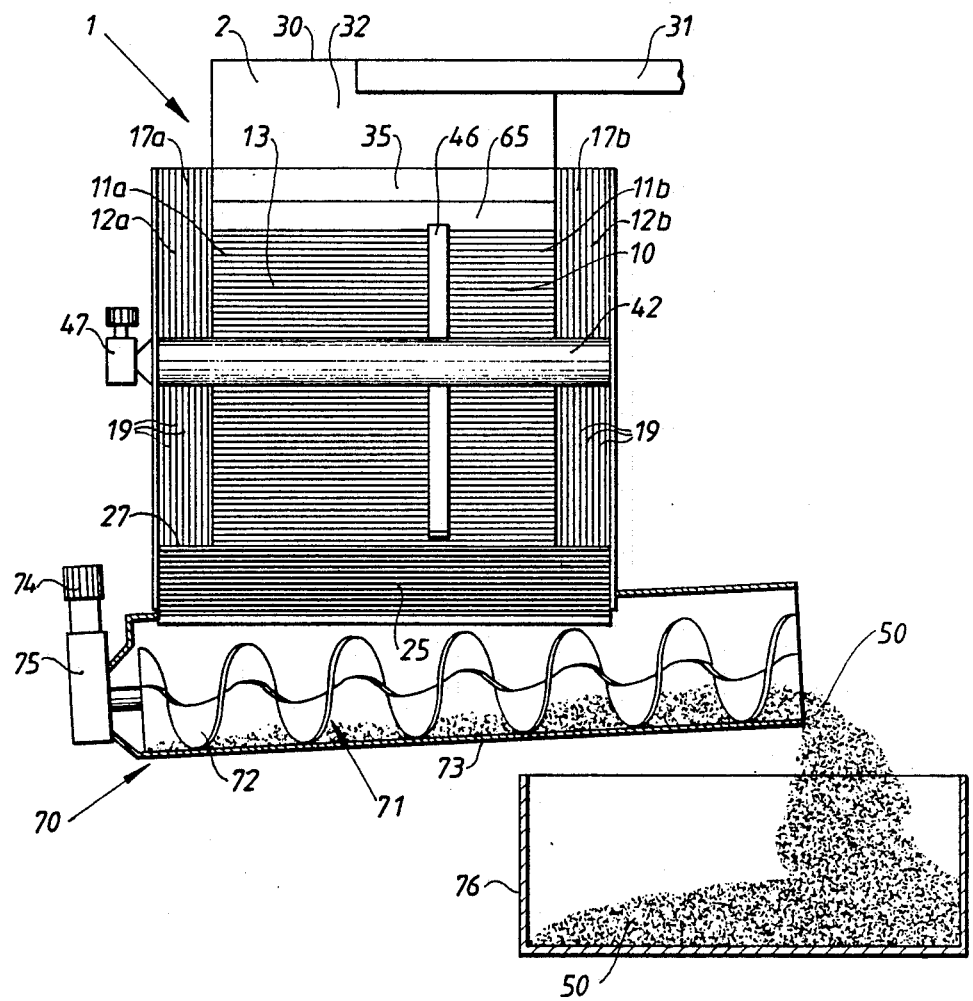
Figure 6:
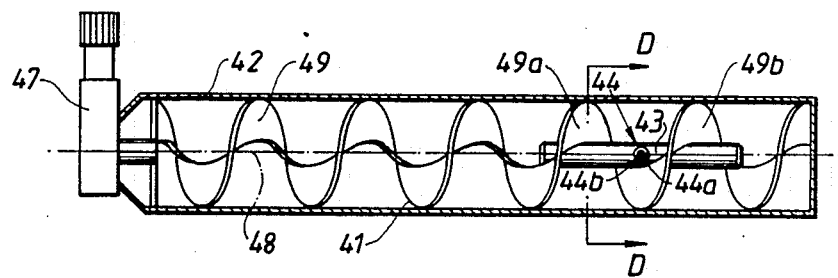
FIG. 6 is a cut-open view of a preferred embodiment of a driving means forming part of a cleaning device.
Figure 7:
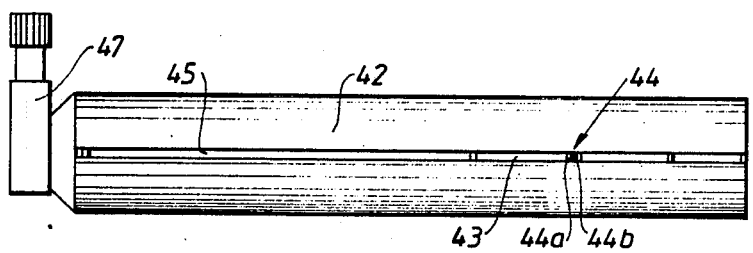
FIG. 7 shows the cleaning device seen from the side.
Figure 8:
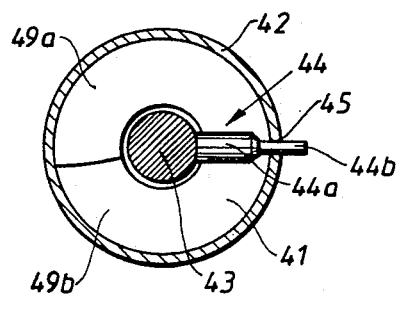
FIG. 8 is a sectional view taken on line D—D in FIG. 6
Figure 9:
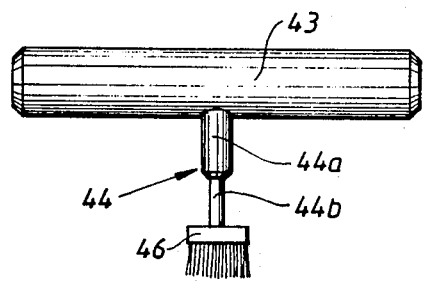
FIG. 9 is a detail view of a cleaning means connected to the sliding body of the driving device.

The transport surfaces 12a, 12b of the connecting means 17a, 17b as a rule form plain surfaces without any passages for the liquid. In certain applications, though, they are provided with bars 19 situated parallel with one another and at a distance from one another (see FIG. 5). These extend as a rule between the upper part 2 of the device and its lower part 3, the bars having an orientation substantially coinciding with the orientation of the intersectional line of the vertical plane with the plane of the upwards facing surface of the screen grid in the region immediately adjoining the actual region of the respective bar. In certain applications the transport surfaces 12a, 12b, at least in their region situated farthest from the screen grid, are angled up in relation to the upwards facing surface of the screen grid as shown for transport surface 12b' in FIG. 3a so as to form an oblique angle in relation to the surface is of the screen grid close to it.

The transport surfaces 12a, 12b of the connecting means in a preferred embodiment, see FIG. 3, are recessed in relation to the upwards facing surface 15 of the screen grid so as to constitute the base in a channel 90a, 90b which is delimited by an outer lateral edge 91a, 91b and an inner lateral edge 92a, 92b wherein the channel passes over into the screen grid 10. The Figure also shows how the grid bars 18 are supported by a grid frame 93. In some embodiments, supplementary grid supports 94 are provided in addition at certain distances along the downwardly facing surface 16 of the screen grid. In the embodiment shown the inner lateral edges 92a, 92b of the channel connect to the grid frame 93.

In a preferred embodiment the screen grid 10 in its lower region 14 extends into an intermediate receiving means 25 with an upwards facing receiving surface 26. This forms an angle to the horizontal which is smaller than the angle which the upwards facing surface 15 of the screen grid situated immediately next to it forms with the horizontal. As a rule the intermediate receiving means is pivotably connected to the screen grid by a bearing 27 to allow adjustment of the angle of the receiving surface 26 in relation to the horizontal plane. The intermediate receiving means is provided with drainage apertures so as to allow the passage of liquid from the top side (upwards facing surface) of the intermediate receiving means to its underside (downwards facing surface) and from there to a receiving means 8 for drained liquid. In a preferred embodiment the apertures of the intermediate receiving means are formed of gaps between adjacently situated bars 24. As a rule the bars have a substantially horizontal orientation. The upwards facing side 26 of the intermediate receiving means is preferably substantially plane and smooth. The size and the shape of the drainage openings as well as the orientation of the intermediate receiving means are adapted to the character of the separated material in order to obtain the required braking and draining effect.

Figure 4:
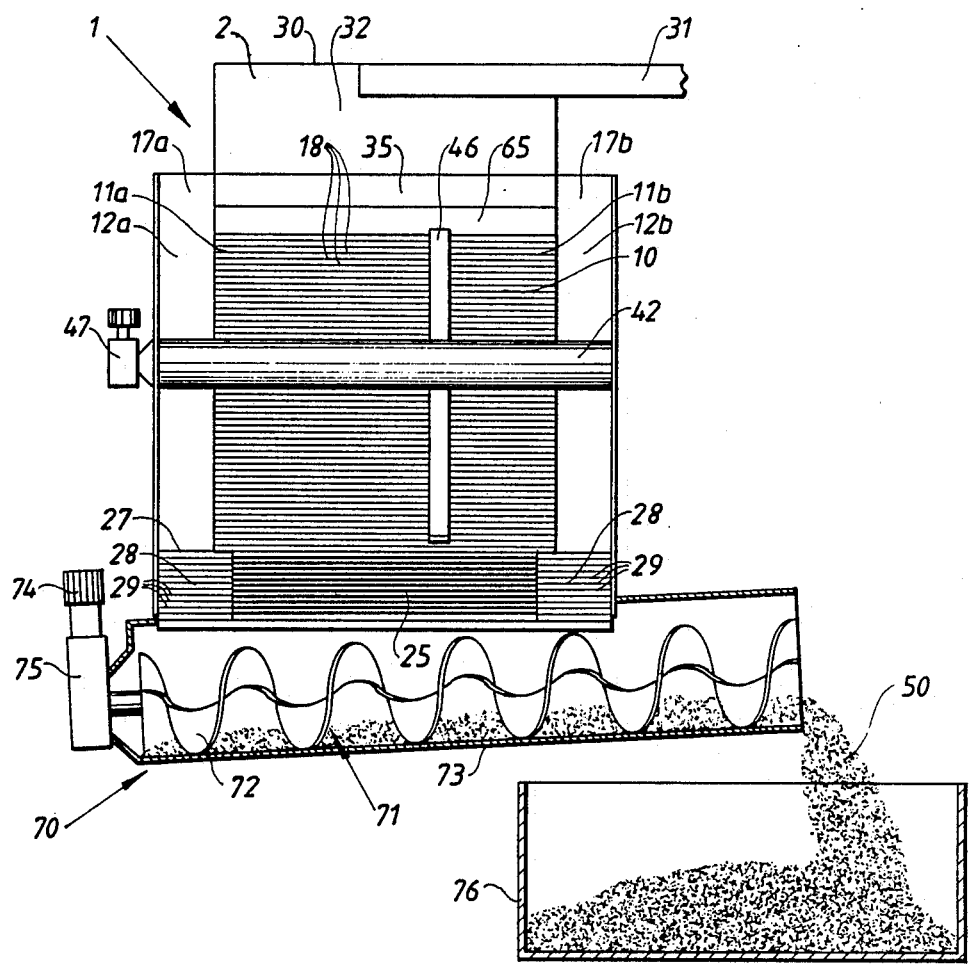

In certain embodiments, see FIG. 4, the intermediate receiving means 24 is designed so that in its outer region 28 it is of a form bringing about a diverging braking-/draining effect compared with the corresponding effect in the center portion of the intermediate receiving means. This diverging effect is obtained e.g. by providing the outer area with bars 29 which form larger or smaller gaps between themselves than the bars in the center portion, by causing the upwards facing limiting surface of the bars to form a smaller angle to the horizontal plane than the upwards facing limiting surface of the intermediate receiving means, or by setting the outer region at a slope which diverges from the slope of the center portion. These outer regions as a rule are allowed to comprise a region nearest the edges of the intermediate receiving means which is somewhat larger than the width of the transport surfaces 12a, 12b of the connecting means 17a, 17b. This is particularly valuable in those applications where there is a danger of screenings with a large water content being fed to the intermediate receiving means in its outer regions. This applies irrespectively of whether the bars of the intermediate receiving means are oriented substantially parallel with the horizontal plane or whether they form an angle with the same, that is to say placed at a slope.

In its upper region the screen grid 10 as a rule extends into an adjoining extension portion 65 which is arranged to receive a liquid flow 60 containing the bodies which are to be separated in a preferred embodiment the extension portion 65 lacks passages through which the liquid can pass through the extension portion. The extension portion has an upwards facing limiting surface 66 which as a rule has a steeper inclination than the region 13 of the upper limiting surface of the screen grid 10 immediately adjoining it. This orientation of the limiting surface 66 is chosen so that the liquid flow which is fed to the screen grid should obtain a high flow rate and should spread out as evenly as possible.

Connected to the upper part 2 of the device and above the upper region 13 of the screen grid is an inlet means 30. From this the liquid is fed to the extension portion 65 and/or the screen grid 10. The inlet means comprises an inlet tank 32 which is delimited by an overflow 33 whose extent substantially corresponds to the width of the screen grid. The overflow is located so that the liquid from the overflow drops down towards the extension portion 65 and/or the upper region 13 of the screen grid. The liquid is supplied to the tank via a feed duct 31 whose opening is placed so that it is always situated above the liquid level which is determined by the overflow 33.

The inlet tank is provided with a connecting wall 36 which is directed towards the bottom 35 of the tank. A partition 34 directed downwards is situated between the front wall 80 of the inlet means and the overflow 33 and projects down a distance into the tank and practically along its entire length. Between the bottom edge of the partition 34 and the tank bottom 35 there exists a passage 81, however, through which can pass liquid together with accompanying bodies. The partition 34 serves as a dampening and equalizing means for the incoming liquid flow.

The bottom 35 and/or the connecting wall 36 in the embodiment shown is/are provided with flaps, i.e. bottom flap 37 and counter flap 38 which as a rule extend along the whole length of the inlet tank. The respective flaps are pivotably supported at joints 82 and 39, respectively, connecting the respective flap to the bottom 35 or the front wall 80 and to the connecting wall 36 or the overflow 33, respectively. The bottom flap in closed position rests against the lower edge of the counter flap 38 and has an outer part 83 which projects in the direction towards the extension portion 65 or alternatively the upper region 13 of the screen grid 10. The outer part, however, does not reach as far as the extension portion or the screen grid respectively, but forms a passage 84 for the liquid flow between the outer part and the extension portion or the screen grid respectively. The bottom as a rule is of a design entailing a downwards slope in the direction towards the openings which are formed when one or the other or both of the flaps are opened.

In a preferred embodiment the bottom flap 37 and/or the counter flap 38 are provided with means which sense the pressure load on the particular flap so that when e.g. sediment has accumulated in a certain quantity in the inlet tank, the bottom flap and/or the counter flap are caused to move from their initial position, as a rule the closing position of the flaps, to the opening position where liquid passes under the overflow to the extension portion 65 and or the upper region 13 of the screen grid. In a preferred embodiment this effect is achieved in that the respective flaps are springloaded. By providing the bottom flap 37 with the outer part 83 a lever arm is created when the flap is opened for the pressure load on the outer part, as a result of which a secure opening process is achieved and a large opening angle for the flap is obtained. This makes it possible also for contaminations of relatively large dimensions to leave the inlet tank. When very highly contaminated fluids or "slurries" are handled it is often appropriate to allow at least some of the flaps to remain slightly open so that sediment accumulated in the inlet tank continuously leaves the same.

The embodiment just described also facilitates the manual cleaning of the inlet tank for the removal of sediment and larger bodies from the same.

In FIG. 3, and especially in FIGS. 6–9, is shown an embodiment of a cleaning device 40 which comprises a shaftless spiral 41 with a spiral blade or thread 49. The spiral is driven by a motor 47 causing it to rotate around its geometrical center axis 48. The shaftless spiral is enclosed by a casing 42 wherein a longitudinal slit 45 is provided. A sliding body 43 directed in the axial direction of the spiral is enclosed by the spiral with play to allow it to rotate around the sliding body. A follower pin comprising an inner part 44a and an outer part 44b and projecting from the enclosed body is connected to a cleaning means 46 consisting as a rule of a brush and-/or a scraper means. On rotation of the spiral the slit hinders the outer part 44b of the pin from following the spiral in its rotation, which means that the spiral thread 49, during its rotation pushes forwards the inner part 44a of the pin which is present between two spiral turns 49a, 49b following one another. As a result also the cleaning means 46 connected to the outer part 44b of the pin is moved in the longitudinal direction of the casing.

In a preferred embodiment the cleaning device with the working brush/scraping means is also provided with flushing nozzles arranged so that they benefit the cleaning of the screen grid and of the brush/scraping means as well as co-operate in the downward transport of the screenings which are being detached from the screen grid. The nozzles as a rule are arranged on the cleaning means 46 and joined via a duct so that they can be connected and disconnected to a water supply e.g. a pipeline under pressure, and, when appropriate via a booster pump.

At the lower part 3 of the device a collecting means 70 is provided to which are fed the screenings 50. In the embodiments shown in the figures the collecting means also comprises a conveying means 71 which includes a spiral 72 preferably designed as a shaftless spiral. The spiral is supported in a trough 73 which at least in the region of the intermediate receiving means 25 is open towards the top. The spiral 72 is driven by a motor 74 which is connected to the spiral via a gear unit 75. The opposite end of the trough, or its extension, is formed by a discharge section 77 located above a container 76 to which the screenings are discharged on rotation of the spiral. As a rule the trough is inclined with an orientation so that its highest level adjoins the discharge section. As a result the screenings are drained of any remaining liquid. Through the use of the conveying means 71 an exchange of the container 76 is facilitated without stopping the liquid flow to the separating device.

In a preferred embodiment of the invention a final drainage of the liquid content of the screenings takes place in the conveying means 71. The latter here includes a squeezing component composed of a rotating casing and a shaftless spiral where the casing has an end region forming a squeezing component and which precedes the discharge opening of the conveying means and in which end region the material is braked and compressed in that the spiral closes (has its free end moved) to the part of the casing which precedes the end region (squeezing part). Such compressing conveying means are described in EP 0 179 842.

The liquid flow 60 is suppled to the inlet tank 32 via the feed duct 31 and passes through the passage 81 and over the overflow 33 to drop down towards the extension portion 65 and/or the upper region 13 of the screen grid 10. The partition 34 has a dampening influence on the movement of the liquid and contributes to the liquid passing over the overflow 33 in a substantially uniform layer.

During the passage along the top surface 15 of the screen grid the accompanying bodies are separated from the liquid which passes between the gaps and is collected in the receiving means 8. The separated bodies form screenings which under the effect of the liquid flow and gravity are successively moved down towards the intermediate receiving means 25 where, owing to the lesser slope of the intermediate receiving means, they build up to a bank 51 of screenings to which material is added successively from the screen grid 10 situated above the intermediate receiving means. The screenings remain behind on the intermediate receiving means until so much material has accumulated that screenings which project from the lower part of the intermediate receiving means are no longer retained on the intermediate receiving means but drop down into the collecting means 70, as a rule into its conveying means 71. Since the screenings remain on the intermediate receiving means for a relatively long period a relatively substantial reduction of the liquid content in the screenings takes place before they pass to the collecting means 70. An optimum bank effect is achieved through adaptation of the angle of slope and the width of gap of the intermediate receiving means to the actual composition of the screenings (especially friction properties) and their liquid content. The bank formation on the lower edge of the intermediate storage means has a double task, namely on the one hand to prevent the liquid which passes along the surface of the screen grid to continue to the conveying means, on the other hand to drain the material in the bank. As a rule the collecting means 70 is provided with a liquid separating conveying means 71 wherein the water content of the screenings is further reduced during their removal to container 76.

Since the bodies which are separated during the passage of the liquid between the bars of the screen grid frequently are of a smeary and sticky character and sometimes are even wedge-shaped, it is not possible simply through the effect of gravity and the influence of the liquid to remove all the screenings which remain on the screen grid 10. The remaining screenings are removed, therefore, by means of the cleaning device 40 which whilst continuously in contact with the screen grid is moved to and fro in the region between its opposite edge regions 11a, 11b. As a rule the length of stroke during the movement of the cleaning device is less than the distance between the outer limitations of the opposite edge regions and consequently a bank of screenings will be formed adjoining the two edge regions 11a, 11b. This bank successively is squeezed out against the transport surfaces 12a, 12b owing to further material being added to the bank of screenings at each stroke carried out by the cleaning device 40. Consequently a slow displacement of material in the screenings bank onto the transport surfaces 12a, 12b takes place. As a result, as long as there are screenings on the screen grid 10, a continuous reduction of the liquid content of the material in the two screenings banks will occur. Furthermore the banks formed prevent the liquid over the screen grid, especially in case of uneven loads, from flowing out over the transport surfaces.

The invention also includes embodiments wherein two adjacent screen grids 10 have a common transport surface 12a, 12b placed between them. Each of the screen grids has either a cleaning device which is specific to the screen grid or several screen grids have a common cleaning device. The movements of the cleaning means 46 are controlled in that disengaged screenings 50 accompanying the cleaning means are moved towards the edge regions 11a, 11b of the screen grids and over the transport surface or surfaces adjoining the edge regions and via the transport surface or surfaces to the lower part of the device.

In order to improve the cleaning of the gaps between bars 18 of the screen grid, the brush or scraper means of the cleaning device is made to penetrate into the passages between the bars at the same time as they are moved in the region between the edge region 11a, 11b of the screen grid. For improved cleaning, the cleaning device is provided with nozzles for liquid through which liquid can be sprayed towards the screen grid in a region of the same adjoining the brush/scraper. This placing of the nozzles means that the banks of screenings in the edge regions 11a, 11b are not sprayed with liquid as a result of which the continuous drainage of the screenings in the banks continues undisturbed during the removal of the material towards the transport surfaces.

As further material is supplied to the banks in the edge regions 11a, 11b material is moved over the transport surfaces 12a, 12b and passes via these down to the intermediate receiving means 25. The transport surfaces consist of material of low friction so that the material as a rule can easily slide down to the intermediate receiving means 25.

It will be obvious to those versed in the art that the cleaning device in certain applications operates continuously whilst in other applications the device operates discontinuously with intervals which are determined by the composition of the bodies which accompany the liquid.

The above detailed description made reference only to a limited number of embodiments of the invention, but it will be readily understood by those versed in the art that the invention allows a great number of embodiments within the scope of the following claims.

What is claimed is:

1. A method of separating solids from a liquid comprising depositing a liquid containing solids onto a grid which is inclined with respect to the horizontal so that the liquid containing the solids flows downwardly along the grid, passing liquid through the grid and retaining solids thereon which travel downwardly on the grid to a lower collecting means, displacing a cleaning means transversely across said grid with reciprocal movement to separate the retained solids from the grid, discharging some of the solids which have been separated from the grid at the opposite lateral edge regions of the grid, receiving the solids discharged at the lateral edge regions of the grid on transport surfaces adjacent to said grid, forming said transport surface of low friction material to expedite travel of the discharged solids thereon and conveying the solids on the low friction transport surfaces towards the lower collecting means.

2. A method as claimed in claim 1 wherein the magnitude of transverse displacement of the cleaning means across the grid is less than the distance between the transport surfaces at the lateral edges of the grid for accumulating a bank of separated solids at each lateral edge of the grid whereat liquid is drained through the grid before the solids are discharged onto the transport surfaces.

3. A method as claimed in claim 1 comprising applying a braking effect on the separated solids before the solids reach the collecting means to intensify separation of liquid from the solids.

4. A method as claimed in claim 1 wherein said cleaning means is displaced transversely by rotating a shaftless spiral within a casing about a longitudinal axis of the spiral, positioning said casing adjacent to said grid, supporting a longitudinally extending body within the shaftless spiral for longitudinal movement therewith, guiding a follower pin secured to said body for longitudinal movement in a longitudinal slot in said casing and attaching said cleaning means to said follower pin outside said casing.

5. A method as claimed in claim 4 wherein said follower pin extends from said body between adjacent spiral turns of said shaftless spiral so that as said spiral rotates said turns cause the follower pin to reciprocate longitudinally of the spiral.

6. A method as claimed in claim 1 wherein said solids are transported from the grid to a container along an upwardly ascending path by a shaftless spiral conveyor via said lower collecting means.

7. Apparatus for separating solids from a liquid comprising an upper part, a lower part, an obliquely arranged screen grid between said upper and lower parts including an upper region, a lower region, and two opposite edge regions, means for supplying liquid containing solids to be separated from the liquid, to said screen grid adjoining said upper region so that solids are separated from said liquid to form screenings, on an upwardly facing surface of said screen grid while the liquid passes through said grid, cleaning means movable substantially horizontally on said upwards facing surface of said grid for disengaging said screenings from said screen grid, connecting means adjacent to each of the edge regions of the grid for receiving screenings discharged laterally from said grid by the cleaning means, each of said connecting means having an upwardly facing transport surface extending along the length of the screen grid, said transport surface being constructed to provide low frictional resistance to said screenings to facilitate the travel of said screenings thereon, and collecting means for receiving solids from the grid and from said connecting means.

8. Apparatus as claimed in claim 7 wherein said transport surface of each connecting means is smooth.

9. Apparatus as claimed in claim 7 wherein said transport surfaces are at least in part inclined with respect to the upper surface of said grid.

10. Apparatus as claimed in claim 7 wherein said connecting means defines channels having bottoms which form said transport surfaces.

11. Apparatus as claimed in claim 7 comprising an intermediate receiving means between said grid and said collecting means, said intermediate receiving means having an upper receiving surface for receiving solids from said grid which forms a smaller angle with the horizontal than does the upwardly facing surface of the grid.

12. Apparatus as claimed in claim 7 comprising an inlet means for the liquid containing solids located above the upper region of the screen grid, said inlet means comprising an inlet tank having an overflow with an extent substantially corresponding to the width of the screen grid, said overflow being located so that liquid drops onto the upper region of the screen grid.

13. Apparatus as claim ed in claim 12 wherein said inlet tank comprises a bottom and a limiting wall connecting the overflow to the bottom, at least a part of the bottom or the limiting wall including a pivotal flap having an open position to provide a direct passage from said bottom to the upper region of the screen grid.

14. Apparatus as claimed in claim 7 comprising an inlet means for the liquid containing solids located above the upper region of the screen grid, said inlet means comprising an inlet tank having an overflow with an extent substantially corresponding to the width of the screen grid, and an extension on said upper region of the screen grid, said overflow facing said extension to deposit liquid thereonto.

15. Apparatus as claimed in claim 7 comprising an inlet means for the liquid containing solids located above the upper region of the screen grid, said inlet means comprising an inlet tank having an overflow with an extent substantially corresponding to the width of the screen grid, and an extension on said upwardly facing surface of said screen grid, said overflow facing said extension to deposit liquid thereonto.

16. Apparatus as claimed in claim 7 wherein said cleaning means includes a cleaning device movable horizontally with reciprocating movement between said edge regions of the screen grid, said cleaning device including a shaftless spiral, a motor for driving the spiral in rotation around a longitudinal axis of the spiral, a casing in which the shaftless spiral is enclosed, said casing having a longitudinal slit, a longitudinal body rotatably enclosed by the spiral, a follower pin projecting from said body and engaged in said slit and a cleaning member on said follower pin outside said casing so that on rotation of the spiral, the follower pin is moved reciprocally.

17. Apparatus as claimed in claim 7 wherein said collecting means includes transport means for transporting solids from the grid and from the connecting means to a container.

18. Apparatus as claimed in claim 17 wherein said transport means includes a casing, and a spiral element in said casing, said casing having an upwardly ascending bottom surface on which the solids are advanced to the container.

19. Apparatus as claimed in claim 18 wherein said spiral element comprises a shaftless spiral.

20. A method as claimed in claim 1 comprising transporting the solids from the grid and from the transport surfaces to the collecting means while separating liquid from said solids.

21. Apparatus as claimed in claim 8 wherein said transport surfaces of said connecting means are of an orientation substantially corresponding to the upward facing surface of the screen grid.

* * * * *